United States Patent
Durrett et al.

(10) Patent No.: US 8,244,461 B2
(45) Date of Patent: Aug. 14, 2012

(54) NAVIGATIONAL DISPLAY FOR PARACHUTISTS

(75) Inventors: Michael G. Durrett, Austin, TX (US);
Keith D. Jamison, Austin, TX (US);
Mark A. Schulze, Austin, TX (US);
Daniel Shedd, N Reading, MA (US)

(73) Assignee: Nanohmics, Inc., Austin, TX (US)

( * ) Notice: Subject to any disclaimer, the term of this patent is extended or adjusted under 35 U.S.C. 154(b) by 663 days.

(21) Appl. No.: 12/367,773

(22) Filed: Feb. 9, 2009

(65) Prior Publication Data

US 2010/0204910 A1    Aug. 12, 2010

(51) Int. Cl.
*G01C 21/00* (2006.01)
(52) U.S. Cl. ........ 701/408; 701/418; 701/445; 701/468; 701/469; 701/470; 244/138 R; 244/142
(58) Field of Classification Search .................. 701/200, 701/3, 213, 408, 418, 445, 468–471; 342/357.52, 342/357.34; 244/138 R, 142
See application file for complete search history.

(56) References Cited

U.S. PATENT DOCUMENTS

| | | | | |
|---|---|---|---|---|
| 5,064,151 A * | 11/1991 | Cerimele et al. | ............ | 244/172.1 |
| 5,798,733 A * | 8/1998 | Ethridge | .................. | 342/357.34 |
| 5,807,109 A * | 9/1998 | Tzidon et al. | .................... | 434/35 |
| 6,542,797 B2 * | 4/2003 | Lohmiller | .......................... | 701/3 |
| 6,574,532 B2 * | 6/2003 | Lohmiller | .......................... | 701/3 |
| 6,934,633 B1 * | 8/2005 | Gallagher et al. | ............ | 701/487 |
| 6,951,322 B2 * | 10/2005 | Klima | ........................ | 244/138 R |
| 7,137,069 B2 * | 11/2006 | Abbott et al. | .................. | 715/744 |
| 7,272,470 B2 * | 9/2007 | Lohmiller | .......................... | 701/3 |
| 7,302,340 B2 * | 11/2007 | Preston | .......................... | 701/487 |
| 2002/0007231 A1 | 1/2002 | Lohmiller | | |
| 2002/0007232 A1 * | 1/2002 | Lohmiller | .......................... | 701/3 |
| 2004/0089763 A1 * | 5/2004 | Redmond | ........................ | 244/10 |
| 2004/0153218 A1 * | 8/2004 | Lohmiller | .......................... | 701/3 |
| 2007/0119328 A1 * | 5/2007 | Maglio et al. | .................. | 102/334 |
| 2007/0233382 A1 * | 10/2007 | Preston | .......................... | 701/213 |
| 2008/0021646 A1 * | 1/2008 | Preston | .......................... | 701/213 |
| 2010/0004913 A1 * | 1/2010 | Becker et al. | ...................... | 703/9 |
| 2010/0026565 A1 * | 2/2010 | Lee et al. | ..................... | 342/26 R |
| 2010/0097208 A1 * | 4/2010 | Rosing et al. | ............. | 340/539.13 |
| 2010/0204910 A1 * | 8/2010 | Durrett et al. | ................. | 701/200 |
| 2011/0130636 A1 * | 6/2011 | Daniel et al. | ................... | 600/301 |
| 2011/0185479 A1 * | 8/2011 | Ohno | ................................ | 2/410 |

* cited by examiner

*Primary Examiner* — Thomas Black
*Assistant Examiner* — Wae Louie
(74) *Attorney, Agent, or Firm* — Claude E. Cooke, Jr.; John J. Love; Cooke Law Firm

(57) ABSTRACT

A display system for a parachutist is provided based on navigation data and calculations of locations where the parachutist should steer the parachute to increase likelihood of reaching a target. A two-dimensional representation of a navigation funnel is displayed. The display may increase situational awareness by use of color to indicate preferred positions in the navigation funnel.

14 Claims, 5 Drawing Sheets

NAVIGATIONAL DISPLAY FOR PARACHUTISTS

The U.S. Government has a paid-up license in this invention and the right in limited circumstances to require the patent owner to license others on reasonable terms as provided for by the terms of Contract No. W911QY-06-C-0104 awarded by U.S. Army Soldier Systems Center.

BACKGROUND OF THE INVENTION

1. Field of the Invention

This invention relates generally to navigation systems, and specifically to navigation and guidance systems for parachutists.

2. Description of Related Art

Special Operations soldiers, sailors, marines, and airmen engage in a type of parachuting that requires advanced training, special equipment, and a high degree of operational and situational awareness. These special types of operations include HALO (High Altitude Low Open) and HAHO (High Altitude High Open) jumps. These jumps may be performed at altitudes above 30,000 feet, requiring a long glide time onto a selected target. Poor weather, low or no visibility, and the use of bulky equipment, including insulating clothing, oxygen masks, combat packs, reserve chutes, and weapons are all challenges facing the special operator as he jumps.

The use of navigational computers in parachute jumps is known in the art. U.S. Pat. No. 7,302,340 ("the '340 patent"), "High Altitude Parachute Navigation Flight Computer," discloses a navigational computer having a display with a self centering satellite map, and a second "window" with a navigational "roadmap" providing a two-dimensional look ahead with right and left steering inputs, onto a 2-D graphical "highway" displayed by operation of an algorithm. A third window indicates selected navigational information, which may include waypoint tracking, glide ratio, ETA (estimated time of arrival, presumably on target), heading, and bearing. The display described is two-dimensional, and it is stated that " . . . the autopilot graphical highway need not be truly three-dimensional but rather two-dimensional, providing look ahead for only right and left required inputs."

What is needed is a display adapted to clearly display information based on three dimensions in a two-dimensional space that provides greater situational awareness to the parachutist than prior displays.

SUMMARY OF INVENTION

A display is provided that displays three-dimensional navigational information through a two-dimensional display. This display includes icons representing the parachutist and the target. The parachutist is guided onto a target through circles, normally eccentric, that are centered on a 3D line that is calculated based on descent rate and wind velocities. The radii of the circles for different altitudes, displayed for the parachutist, indicate the boundary of a three-dimensional volume (designated herein a "navigation funnel") within which the parachutist is predicted to reach the selected target. The situational status of the parachutist may be further communicated by the use of colors or symbols in the circles.

DETAILED DESCRIPTION

Figure 1:
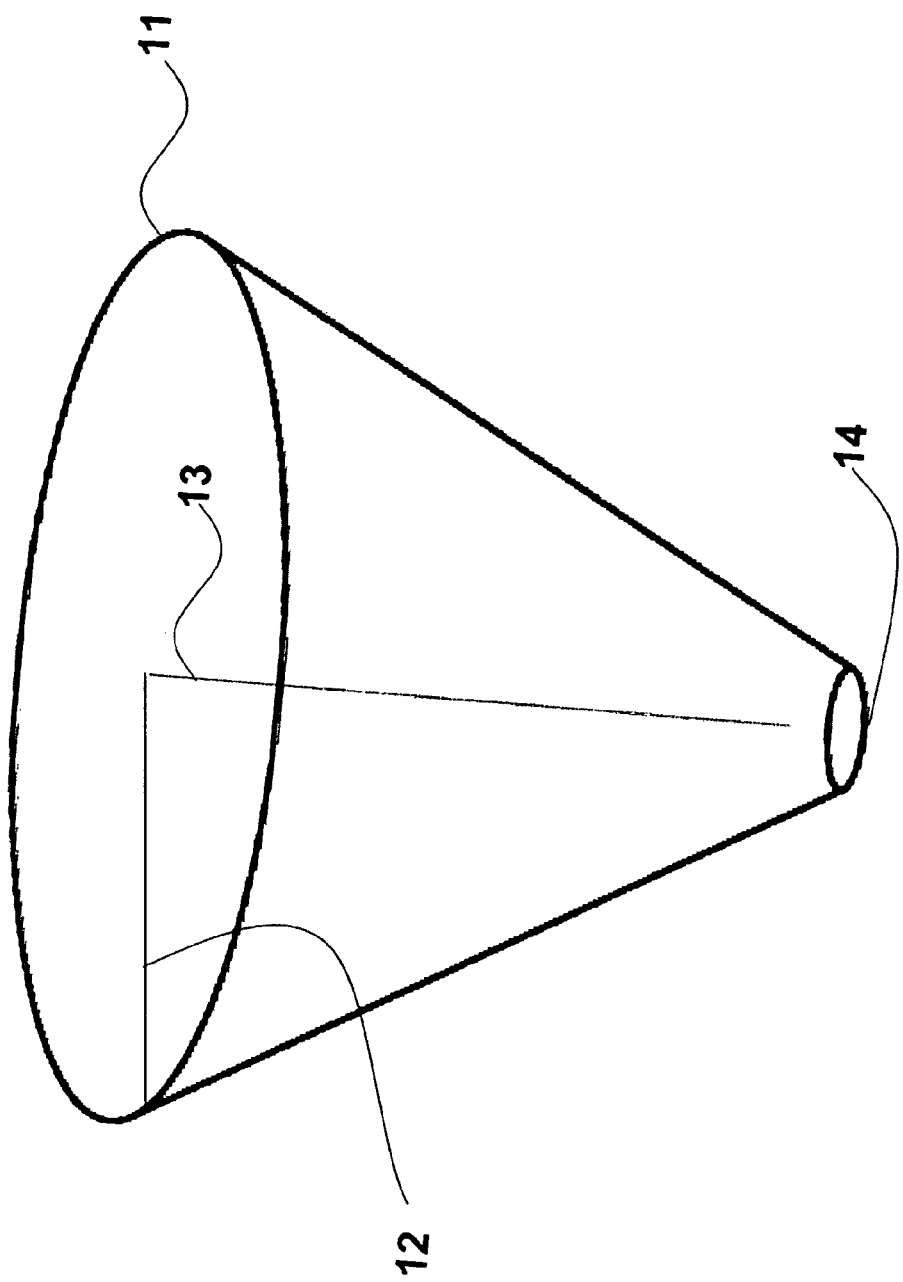
FIG. 1 is a perspective 3-D view of a navigation funnel without wind.

Referring to FIG. 1, a perspective view of funnel 11 is illustrated. For this illustration, wind velocity is assumed to be zero at all altitudes. Line 13 is a hypothetical 3D line, which is determined only by the descent rate of the parachute and wind velocities. (A hypothetical 3D line will be defined herein as the center line of a volume or navigation tunnel within which a parachutist is predicted to reach the target.) Since wind velocity is assumed to be zero in this illustration, line 13 is vertical. Beginning at a given altitude, the three-dimensional volume within which the parachutists may reach target 14 is described by surface 11 of the navigation funnel. In this case the funnel is a cone. The circular cross-section of any point in the cone is determined by radius 12 around hypothetical 3D line 13, where radius 12 is calculated by multiplying L/D (glide ratio) for the parachute by the parachutist's altitude. Said another way, radius 12 is the distance that a parachutist can travel forward relative to the wind at a given glide ratio (L/D) and at the current altitude.

Figure 2:
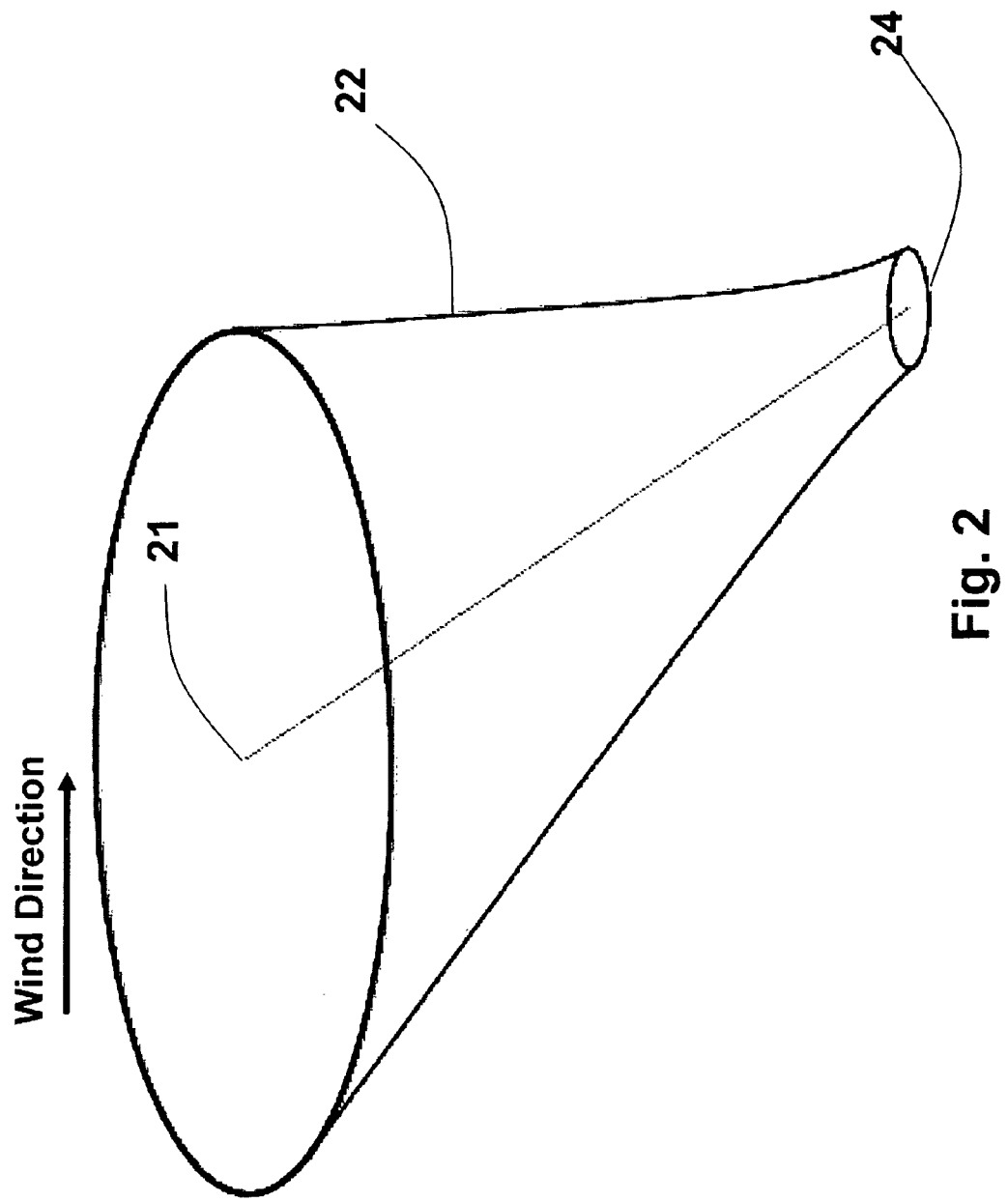
FIG. 2 is a perspective 3-D view of a navigation funnel calculated for a constant wind velocity at different altitudes.

FIG. 2 illustrates the effect of a constant wind velocity at different altitudes on the hypothetical 3D line and the three-dimensional volume within which the parachutists may reach target 24. Hypothetical 3D line 21 is a straight line at an angle to vertical that is determined by vector addition of the vertical descent rate of the parachute and the velocity of the wind. Descent rate of the parachute is determined by weight supported by the parachute and canopy characteristics. Surface 22, which again limits the three-dimensional spatial volume within which the parachutists may reach selected target 24, is determined by the glide ratio (L/D) of the parachute. The radius of a circle around 3D line 21 at any altitude is again calculated by multiplying L/D for the parachute by the parachutist's altitude.

Figure 3:
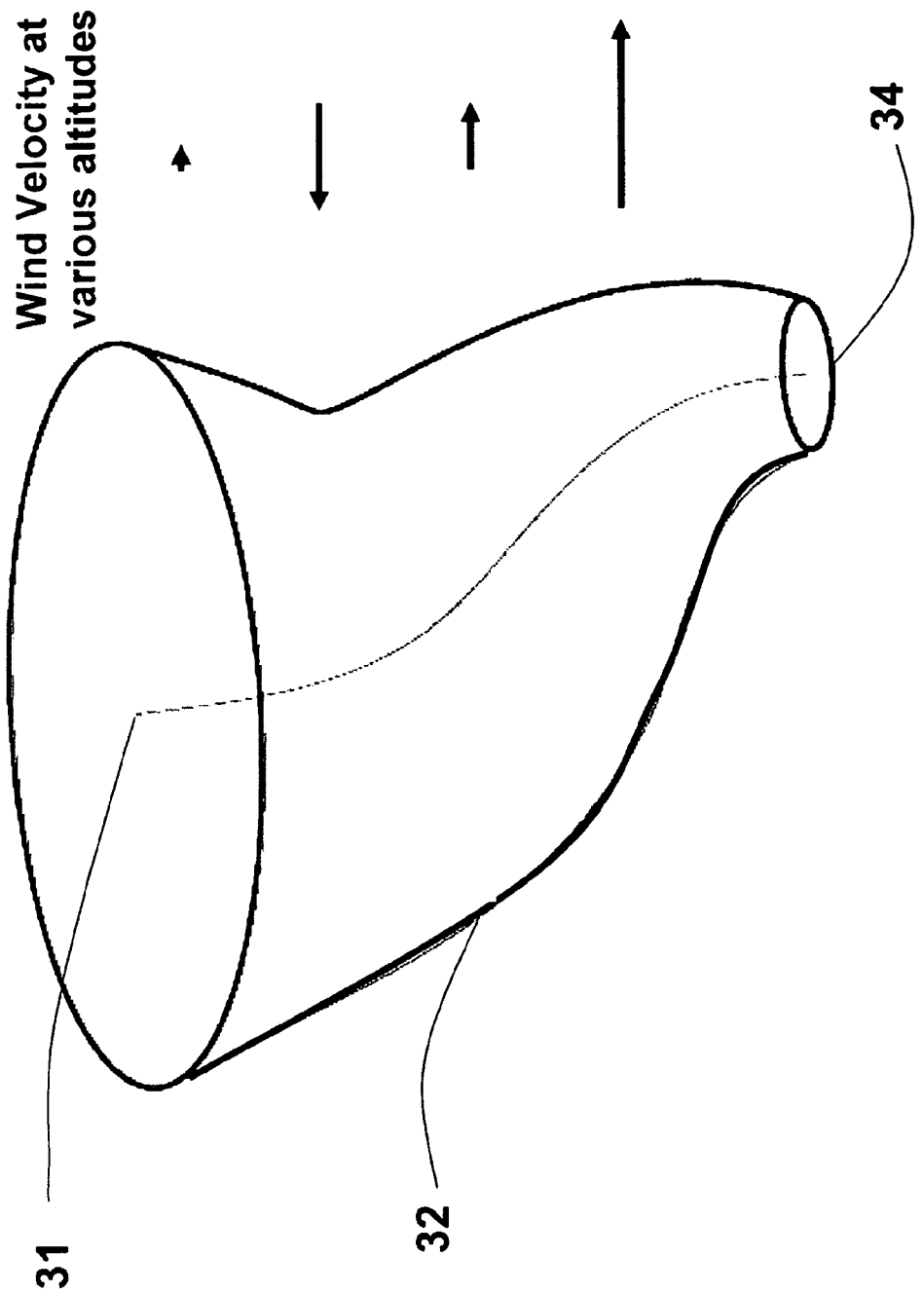
FIG. 3 is a perspective 3-D view of a navigation funnel calculated for varying wind velocities at different altitudes.

The general case is illustrated in FIG. 3, where wind velocities vary at different altitudes. In one embodiment, hypothetical 3D line 31 is calculated by starting at target 34 and calculating coordinates as a function of altitude by vector addition of the vertical descent rate of the parachute and the horizontal velocity of the wind, just as discussed above. This calculation will normally extend up to the altitude where the canopy is deployed. The resulting string of coordinates describes the three-dimensional path the parachute would take with no steering or forward movement relative to the wind. Input parameters to calculate line 31 include parachute descent rate, wind velocities vs altitude and target and canopy deployment and target coordinates. The 3D navigation tunnel is then calculated by calculating the radius from the 3D line a parachutist can be at present altitude and any lower altitude and still reach the target if he were to steer straight towards the 3D line, given the L/D of his parachute, with the limitation that he must reach the line when he reaches the target. Doing this calculation at selected altitudes produces the coordinates of the surface 32 of the navigation funnel. The funnel may twist and turn depending on the variation of the winds at altitude, but the cross-section of the funnel is circular at any altitude.

In other embodiments, other methods of calculating the hypothetical 3D line at the center of a navigation funnel may be used. For example, a stochastic method based on probabilities of wind velocities at different altitudes may be used. For purposes of the display method disclosed herein, any method of calculating the 3D line may be used. In each case, the radius of a circle around the 3D line is calculated using the L/D of the parachute as explained above.

Figure 4:
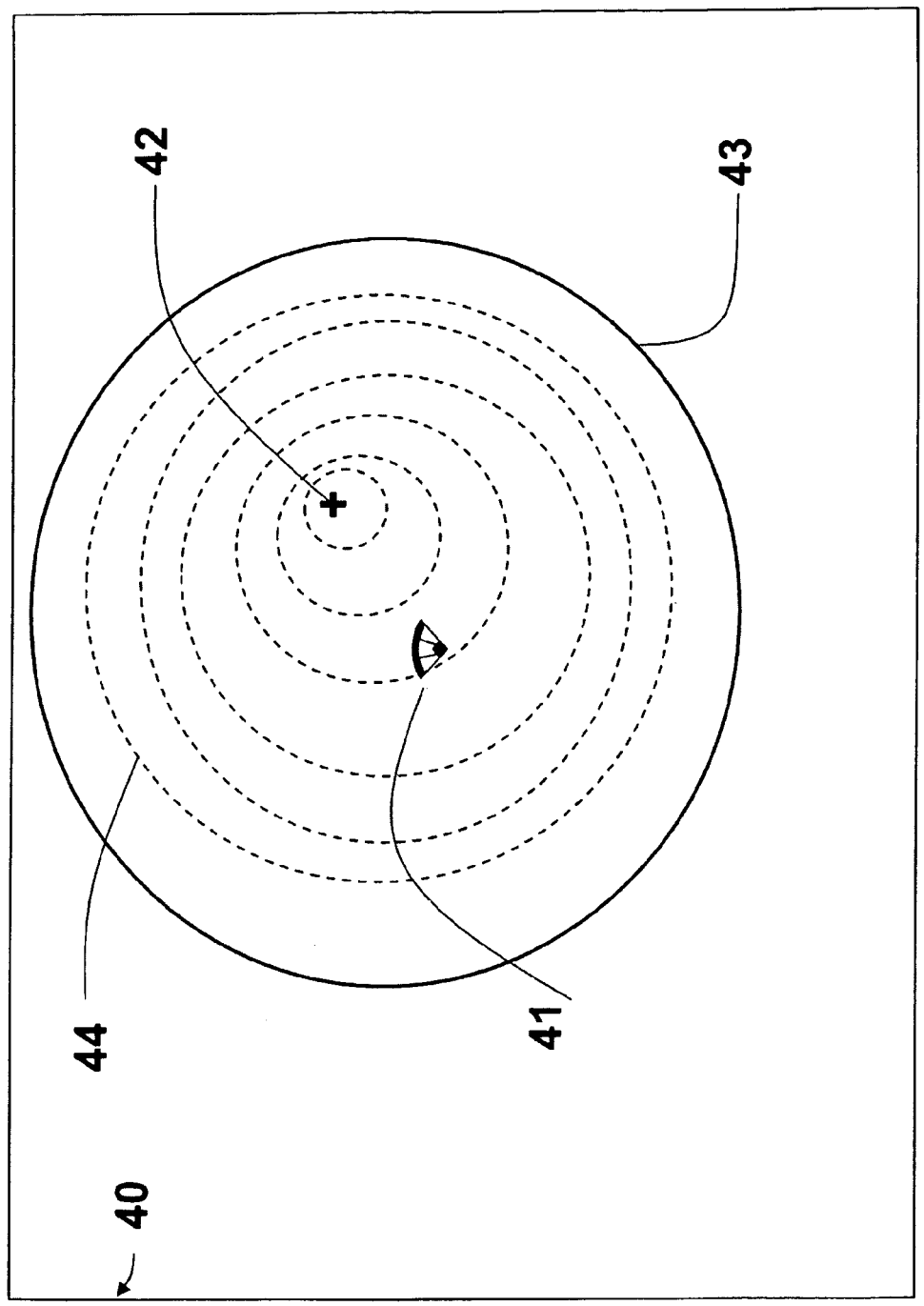
FIG. 4 is a view of a 2-D display based on the method and apparatus disclosed herein.

Referring to FIG. 4, boundary 40 of a 2D display is illustrated as it may be presented to the parachutist. The hardware for the display may be comprised of any collection of components adapted for displaying graphical information. Preferably, the display device is capable of displaying information in more than one color. Suitable display devices include liquid crystal displays, cathode ray tubes, and projected images such as "heads up displays." The display device may be chest mounted or a tablet or helmet-mounted. Night Vision Goggles (NVGs) may be used for the display device. The display disclosed herein may also displayed on wirelessly connected devices, such as an iPhone, where the display is created in a browser.

Circles of different radii that correspond to the surface at different altitudes of the navigation tunnel are shown on the display. Outer circle 43 has the radius of the tunnel at the current altitude of the parachutist. Icon 41 represents the present location and orientation of the parachutist, which may be determined by GPS data. Icon 42 represents the target of the parachutist. Eccentric circles within outer circle 43, such as circle 44, indicate the spatial extent within which the parachutist has the ability to reach the given target at lower altitudes. Each circle represents the surface of the navigation funnel, such as shown in FIGS. 2 and 3, at a selected altitude. These circles may be dotted or have other symbols. Circles may be displayed using a Night Vision Goggle (NVG) device, with the circles represented with various combinations of colors, blinking, dashed lines, line width or other symbols. Circles may be flashed onto the display or iteratively added then redrawn. The relative location of the centers of lower eccentric circles provides an indication of the wind direction and speed at current and lower altitudes. Steering the parachute to stay near the center of the circle at each altitude provides the highest probability of the parachutist attaining the target.

Preferably, the direction of the screen is always oriented with the direction of motion of the parachutist up and with the parachutist icon centered on the screen, as shown in FIG. 4. If the parachutist performs a turn, the target and funnel intersections will preferably rotate about the parachutist icon. The circles indicating the spatial range where it is possible to reach a given target may be continuously updated based on GPS measurements and other input data. The screen provides a visual description of the parachutist's situation. Relative bearing to target is provided and the displacements of the circles provide the parachutist with an indication of the wind velocity at different altitudes. The circles also clearly provide an indication of the ability to reach the target. The colors of the largest circle or any combination of circles or icons may change from green, meaning well with the ability to reach the target, to yellow, meaning possible to reach the target but on the very edge of possibility, to red, meaning that it is predicted that it is not possible to reach the target.

Wind velocities are generally obtained prior to the jump via meteorological forecasts from, for example, the National Weather Service and provided by local airports or alternately from the Joint Precision Airdrop System (JPADS). Wind velocities may also be updated via drop sondes and recalculated and transmitted from aircraft JPADS units. Navigation inputs, including speed, direction of travel, location and altitude are received from a GPS mounted on or within the navigation computer.

For examples: the red zone may be designated as when the parachutist is outside the calculated circle at current altitude; the yellow zone may be when the jumper is within the outer 20% of the radius; and the green zone may be designated as when the jumper is within the inner 80% of the circle.

Figure 5:
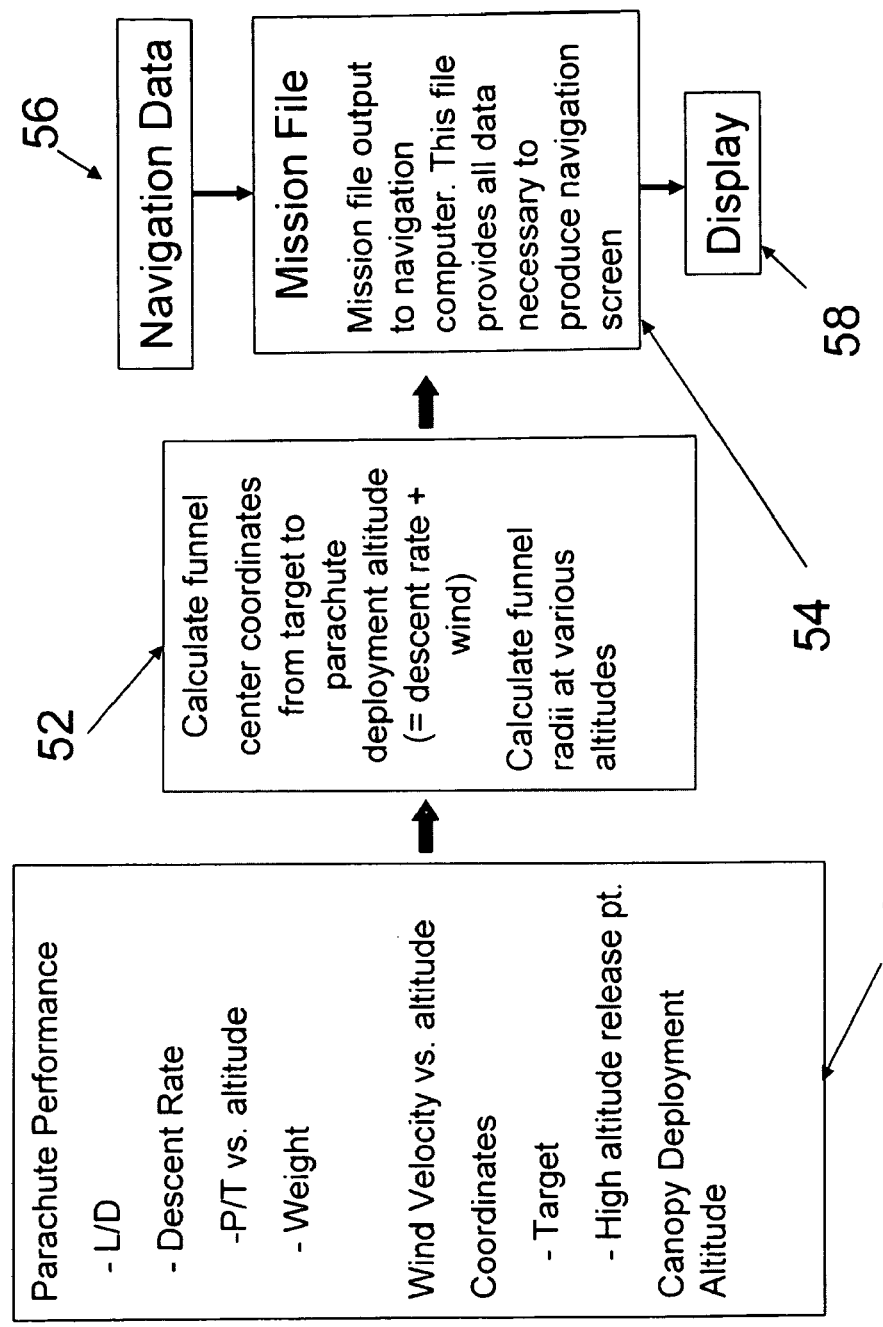
FIG. 5 is a flow chart illustrating gathering of data, performing calculations of a navigation funnel and outputting to hardware for display.

Referring to FIG. 5, input data 50 are entered into mission computer 52. Input data include parachute performance characteristics: glide ratio (L/D) and descent rate for various pressure and temperature conditions and weight of the parachutist and equipment. Data for wind velocities vs. altitude are input. Other input data may be coordinates of the High Altitude Release Point and of the target and the canopy deployment altitude. Mission computer 52 calculates the coordinates of the 3D line that will be the center of the navigation funnel at various altitudes from the target to the canopy deployment altitude. The radii of the circles around the 3D line are then calculated. Results of these calculations go into a mission file, which is provided to display computer 54. Display computer 54 preferably is continuously receiving navigation data 58, including location, speed over ground, altitude and heading of the parachutist, which may be sent to display 58. Display computer 54 controls display 58 for the parachutist. Screen display 58 may also include target/HARP coordinates, wind velocities, funnel centers at various altitudes and other information.

Alternatively, an airdrop planning system based on other techniques, such as discussed by Hattis et al, "An In-Flight Precision Airdrop Planning System," presented at the $23^{rd}$ Army Science Conference, Dec. 2-5, 2002, Orlando, Fla., may be used to generate a mission file that is output to the display computer. The radius of circles around the center line will be calculated as described above.

The software to perform the functions described was designed to run on Windows computers and was tested extensively on Windows XP. The current platform of choice is a General Dynamics MR1. Additional text may also be provided on a display to show expected ground speed, actual ground speed, altitude corresponding to each circle in the display, and other information that may be important to a parachutist. This information may include input from other team members. Such information is discussed in the '340 patent, cited above, for example, which is hereby incorporated by reference in its entirety.

Although the present invention has been described with respect to specific details, it is not intended that such details should be regarded as limitations on the scope of the invention, except to the extent that they are included in the accompanying claims.

The invention claimed is:

1. A method implemented by a computer for providing a display for a parachutist, comprising:
    providing to a computer coordinates of a hypothetical 3D line from a parachute deployment altitude to a target based on a prediction of wind velocities and a prediction of descent rate of the parachute at different altitudes and storing the results using a computer-readable medium in a navigation data file in the computer;
    programming the computer to calculate the radii of circles around the all line at selected altitudes by multiplying the selected altitudes by a glide ratio of the parachute;
    calculating the radii of circles and storing the results using a computer-readable medium in the navigation data file; and displaying the circles at selected altitudes for the parachutist on a display device.

2. The method of claim 1 wherein the hypothetical 3D line is provided by calculating coordinates at different altitudes beginning with coordinates of the target and moving to the parachute deployment altitude based on the prediction of wind velocities at different altitudes and the predicted descent rate of the parachute at different altitudes.

3. The method of claim 2 wherein the wind velocities are results of measurements received as input data.

4. The method of claim 2 wherein the wind velocities are predictions based on a stochastic model.

5. The method of claim 1 wherein the circles are displayed in selected colors.

6. The method of claim 1 further comprising displaying navigation data as an icon showing position and heading for the parachutist along with the circles.

7. The method of claim 6 wherein the circles are displayed in selected colors and the color of selected circles changes in response to the position of the parachutist.

8. The method of claim 6 wherein the circles are displayed by different symbols, line widths, line dashes or blinking and the symbols, line widths, line dashes or blinking of the circles changes in response to the position of the parachutist.

9. A method for providing a display for a parachutist having a parachute deployment altitude and a target having a coordinate, comprising:
   gathering input data on conditions affecting a path of the parachutist;
   calculating coordinates of a 3D line from the target to the parachute deployment altitude based on a prediction of wind velocity and a prediction of descent rate only, assuming the parachutist does not steer the parachute;
   calculating the radii of circles around the 3D line at selected altitudes based on glide ratio of the parachute and altitude, to predict a navigation tunnel within which the parachutist may steer the parachute toward the 3D line before reaching the target, to produce a file of coordinates of the 3D line and the calculated radii;
   obtaining navigation data for the coordinates and heading of the parachutist and storing the results using a computer-readable medium; and
   supplying the file of coordinates of the 3D line and the calculated radii and the navigation data to a display computer, the display computer having input to a display device, to produce a display of circles having calculated radii for selected altitudes and icons representing coordinates of the target and coordinates and heading of the parachutist.

10. The method of claim 9 wherein the circles are displayed in selected colors on the display device so as to increase situational awareness of the parachutist.

11. The method of claim 9 wherein a direction of the heading of the parachutist is determined with respect to the circles and the display is calculated such that the circles rotate around the icon representing the parachutist on the display device when the heading of the parachutist changes.

12. The method of claim 9 wherein the circles are displayed by a plurality of symbols, line widths, dashes or blinking.

13. The method of claim 9 wherein the display device is a liquid crystal display, a cathode ray tube or projected images such as "heads up displays."

14. The method of claim 9 wherein the display device is used with Night Vision goggles and the circles are displayed by different colors, symbols, line widths, line dashes or blinking and the colors, symbols, line widths, line dashes or blinking of the circles changes in response to the position of the parachutist.

* * * * *